(12) United States Patent
Kitagawa

(10) Patent No.: US 7,781,978 B2
(45) Date of Patent: Aug. 24, 2010

(54) VEHICULAR LAMP

(75) Inventor: Takayoshi Kitagawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 239 days.

(21) Appl. No.: 12/143,999

(22) Filed: Jun. 23, 2008

(65) Prior Publication Data
US 2009/0003007 A1    Jan. 1, 2009

(30) Foreign Application Priority Data
Jun. 29, 2007    (JP) ............................. 2007-172777

(51) Int. Cl.
*B60Q 1/02* (2006.01)
(52) U.S. Cl. .................... 315/82; 315/291; 315/247; 315/185 S; 315/312
(58) Field of Classification Search ............... 315/247, 315/246, 209, 224, 225, 291–326, 76–78, 315/80–83, 185 S, 185 R
See application file for complete search history.

(56) References Cited

U.S. PATENT DOCUMENTS

| | | | |
|---|---|---|---|
| 4,195,281 A * | 3/1980 | Bell | 340/458 |
| 6,873,111 B2 | 3/2005 | Ito et al. | |
| 7,339,328 B2 * | 3/2008 | Tehori et al. | 315/246 |
| 7,482,756 B2 * | 1/2009 | Kesterson | 315/82 |

* cited by examiner

*Primary Examiner*—Tuyet Vo
(74) *Attorney, Agent, or Firm*—Fish & Richardson P.C.

(57) ABSTRACT

A vehicular lamp includes a semiconductor light source and a switching means arranged to switch between a first lighting mode, in which the semiconductor light source stays on, and a second lighting mode, in which the semiconductor light source repeatedly turns on and off. The lamp is arranged so that a peak current flowing through the semiconductor light source in the second lighting mode is smaller than that in the first lighting mode. The arrangement can help suppress overshooting and undershooting in the light source current.

3 Claims, 2 Drawing Sheets

VEHICULAR LAMP

RELATED APPLICATIONS

The present application claims the benefit of priority of Japanese application no. 2007-172777, filed on Jun. 29, 2007, the contents of which are incorporated herein by reference.

TECHNICAL FIELD

The present disclosure relates to a vehicular lamp that uses a semiconductor light source such as a semiconductor light-emitting element as a vehicular light source.

BACKGROUND

Lamps for vehicles such as automobiles have been proposed that use a semiconductor light-emitting element such as a light emitting diode (LED) as a semiconductor light source and use the LEDs for both a tail lamp and a stop lamp. (See, e.g., U.S. Pat. No. 6,873,111)

In order to use the LED for both the tail lamp and the stop lamp, a switching transistor is provided in series with the LED in an output loop of a circuit to control lighting of the LED. In addition, an on/off signal having a different duty ratio is applied to the switching transistor depending on whether operation is in a mode that makes the LED function as the tail lamp or a mode that makes the LED function as the stop lamp. Thus, the brightness of the LED is adjusted depending on the mode.

According to the foregoing patent document, the on/off signal having the different duty ratio is applied to the switching transistor depending on the mode so as to adjust the brightness of the LED. Therefore, the LED can be used for both the tail lamp and the stop lamp. The duty ratio of the on/off signal applied to the switching transistor changes according to the mode, and the peak value of the current supplied to the LED remains constant. Accordingly, when the light is reduced, such as when the LED functions as the tail lamp, the average current of the LED decreases according to the reduction in the duty ratio of the on/off signal. On the other hand, when the switching transistor is on, overshooting or undershooting occurs in the LED current.

SUMMARY

The present invention was made in light of the foregoing problems. In some implementations, the present invention can help suppress overshooting and undershooting in the current of the semiconductor light source when lighting the semiconductor light source in a different lighting mode.

Various aspects are set forth in the claims. For example, in one aspect, a vehicular lamp includes a semiconductor light source; switching means connected to the semiconductor light source in series for adjusting a current flowing through the semiconductor light source by on/off operation; and current control means for detecting the current flowing through the semiconductor light source and controlling the current supplied to the semiconductor light source according to a detected current value. The vehicular lamp is arranged to switch between a first lighting mode in which the semiconductor light source stays on and a second lighting mode in which the semiconductor light source repeatedly turns on and off. The current control is arranged such that a peak current flowing through the semiconductor light source in the second lighting mode is smaller than that in the first lighting mode.

The semiconductor light source is lit in the first lighting mode or in the second lighting mode. When the lamp is switched to the second lighting mode, the current control means controls the lamp such that the peak current flowing through the semiconductor light source in the second lighting mode is smaller than that in the first lighting mode. Therefore, it is possible to suppress overshooting and undershooting in the current of the semiconductor light source. In addition, the peak current flowing through the semiconductor light source in the second lighting mode is smaller than that in the first lighting mode. As a result, the duty ratio of the signal for the on/off operation of the switch is higher than that for the non-reduced peak current, and an appropriate current for the second lighting mode is supplied to the semiconductor light source. Therefore, it is possible to maintain the linearity of the duty ratio and the amount of light, and also suppress variation in the amount of light from the semiconductor light source.

In some implementations, the first lighting mode is for lighting a daytime running lamp; and the second lighting mode is for lighting a position lamp, wherein the product of time and the current flowing through the semiconductor light source in the second lighting mode is less than or equal to one-tenth of the product of time and the current flowing through the semiconductor light source in the first lighting mode.

The product of time and the current flowing through the position lamp in the second lighting mode preferably is set to be less than or equal to one-tenth of the product of the time and the current flowing through the daytime running lamp in the first lighting mode. Therefore, it is possible to light the semiconductor light source with high precision in a lamp used both as a daytime running lamp and as a position lamp.

Other aspects and features will be readily apparent from the following detailed description, the accompanying drawings and the claims.

DETAILED DESCRIPTION

Figure 1:
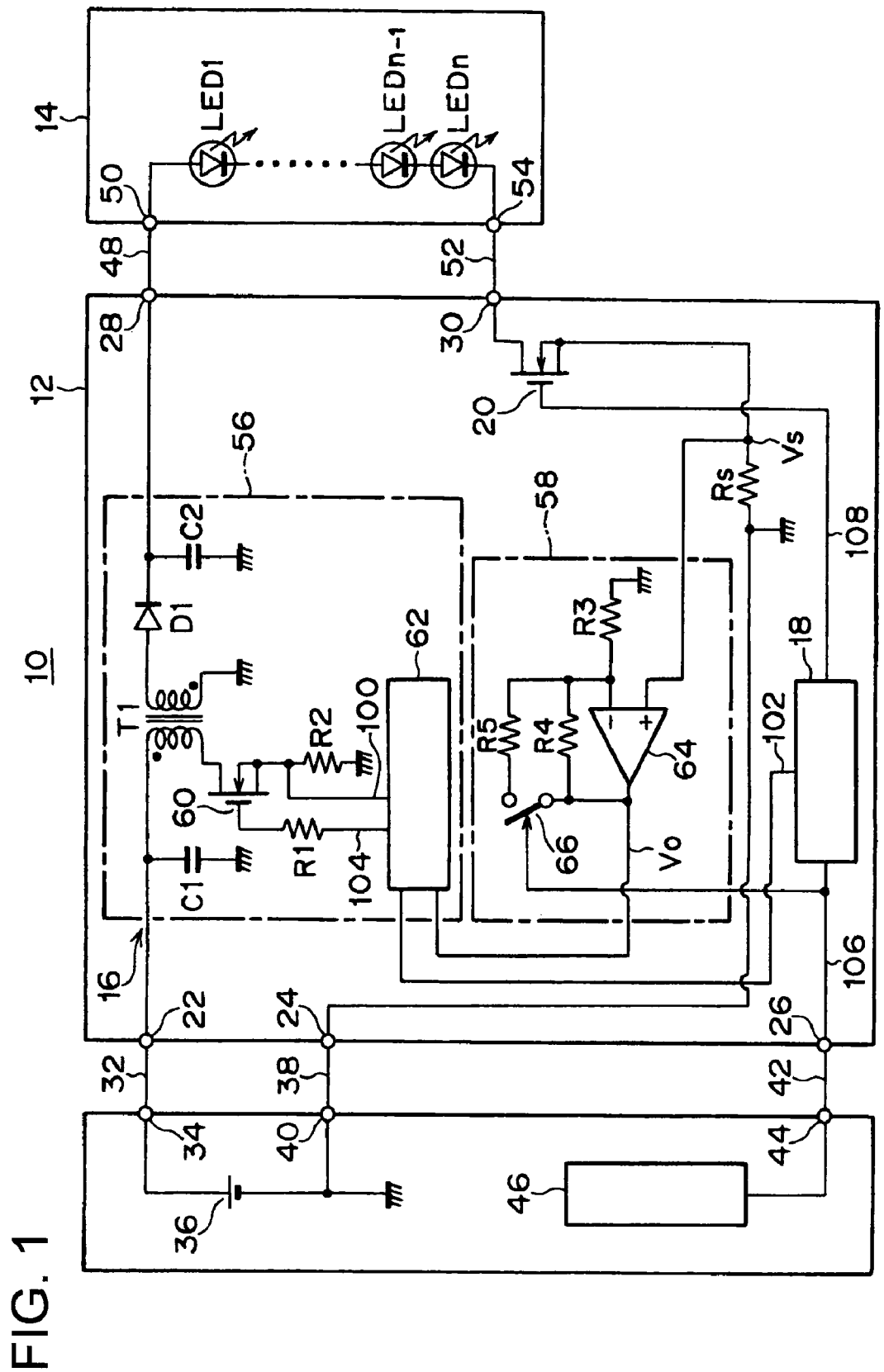
FIG. 1 is a circuit configuration diagram of a vehicular lamp that shows an example of the present invention.

As illustrated in the example of FIG. 1, a vehicular lamp 10 has includes an LED driver 12 and a light source portion 14. The LED driver 12 includes a DC/DC converter 16, a pulse width modulation (PWM) signal generation circuit 18, a shunt resistance Rs, an NMOS transistor 20, input terminals 22, 24, 26, and output terminals 28, 30. The input terminal 22 is connected to a positive (+) terminal of an on-board battery (direct-current power source) 36 via a wire harness 32 and a vehicle-side power terminal 34. The input terminal 24 is connected to a negative (−) terminal of the on-board battery (direct-current power source) 36 via a wire harness 38 and a vehicle-side power terminal 40. The input terminal 26 is connected to a vehicle electronic control unit (ECU) 46 via a wire harness 42 and a vehicle-side signal terminal 44. The output terminal 28 is connected to an input terminal 50 of the light source portion 14 via a wire harness 48. The output terminal 30 is connected to an output terminal 54 of the light source portion 14 via a wire harness 52.

The DC/DC converter 16 includes a constant current driving portion 56 and a non-inverting amplifier 58 as an element of current control means, which controls a current supplied to the light source portion 14 according to the current value of the shunt resistance Rs that detects the current flowing through the light source portion 14. The constant current driving portion 56 includes a transformer T1, a diode D1, an NMOS transistor 60, a control circuit 62, condensers C1, C2, and resistances R1, R2 as a flyback switching regulator. One end side of the condenser C1 and the primary side of the transformer T1 are connected to the input terminal 22. A connection point between the diode D1 and the condenser C2 is connected to the output terminal 28. A gate of the NMOS transistor 60 is connected to the control circuit 62 via the resistance R1. A source of the NMOS transistor 60 is connected to the control circuit 62 and is grounded via the resistance R2.

The control circuit 62 includes an integrated circuit (IC), for example, and functions as a computing unit. The control circuit 62 generates a switching signal (pulse signal) for maintaining a constant output voltage Vo as a control signal 104, based on a current detection signal 100 obtained from the voltage at both ends of the resistance R2 and the output voltage Vo of the non-inverting amplifier 58. At this time, the control circuit 62 synchronizes the signal with the synchronized signal 102 from the PWM signal generating circuit 18. The generated control signal 104 is applied to the gate of the NMOS transistor 60. When the control signal 104 is applied to the gate of the NMOS transistor 60, the specified current is applied to the light source portion 14. Thus, the NMOS transistor 60 performs a switching operation according to the control signal 104. When direct voltage from the on-board battery 36 is applied to the transformer T1, the NMOS transistor 60 performs the switching operation according to the control signal 104. For example, when the NMOS transistor 60 is on, the direct voltage is stored in the primary winding of the transformer T1 as electromagnetic energy. Next, when the NMOS transistor 60 is off, the stored electromagnetic energy is released from the secondary winding of the transformer T1 as an alternating current. The released electromagnetic energy is rectified by the diode D1, smoothed by the condenser C2, and converted into a direct current. The direct current is supplied to the light source portion 14 from the output terminal 28 via the wire harness 48 and the input terminal 50.

A step-up or step-down switching regulator, as well as the flyback switching regulator, can be used as the constant current driving portion 56.

The non-inverting amplifier 58 includes an operational amplifier 64, a switch 66, and resistances R3, R4, R5. The resistance R4 is connected between a minus input terminal and an output terminal of the operational amplifier 64, and the resistance R5 is connected therebetween via the switch 66. A voltage Vs at both ends of the shunt resistance Rs, which acts as a current detection element for detecting the current of the light source portion 14, is applied to a plus input terminal of the operational amplifier 64. The voltage at both ends of the resistance R3 is applied to the negative input terminal thereof.

The non-inverting amplifier 58 converts the current of the shunt resistance Rs into the voltage Vs so as to import the voltage Vs. In addition, the non-inverting amplifier 58 amplifies the voltage Vs based on the voltage at both ends of the resistance R3 and outputs the output voltage Vo to the control circuit 62. A gain of the non-inverting amplifier 58 changes depending on the on/off status of the switch 66. The switch 66 can be, for example, a semiconductor switch element that performs the on/off operation in response to a daytime running lamp (light) (DRL)/position (POS) switching signal 106 from the vehicle electronic control unit (ECU) 46.

The vehicle electronic control unit (ECU) 46 provides a high-level signal as the DRL/POS switching signal 106 to the vehicle-side signal terminal 44 in a first lighting mode such that the light source portion 14 is lit as a daytime running lamp. In a second lighting mode, the ECU 46 provides a low-level signal as the DRL/POS switching signal 106 to the vehicle-side signal terminal 44 such that the light source portion 14 is lit as a position lamp.

The switch 66 is turned on in the first lighting mode in response to the high-level DRL/POS switching signal 106 and is turned off in the second lighting mode in response to the low-level DRL/POS switching signal 106. When the switch 66 is on, the resistance R4 and the resistance R5 are connected in parallel between the negative input terminal and the output terminal of the operational amplifier 64. When the switch 66 is off, only the resistance R4 is connected between the negative input terminal and the output terminal of the operational amplifier 64.

A gain of the operational amplifier 64 is determined by the ratio of the resistance R3 to the resistance connected between the negative input terminal and the output terminal of the operational amplifier 64 (the ratio of the resistance values). Specifically, in the first lighting mode, the gain is expressed as the ratio of the resistance R3 to the combined resistance of the resistance R4 and the resistance R5. In the second lighting mode, the gain is expressed as the ratio of the resistance R3 and the resistance R4. The gain in the second lighting mode is higher than the gain in the first lighting mode.

When the gain of the operational amplifier 64 in the second lighting mode is higher than that in the first lighting mode, the apparent output voltage Vo of the non-inverting amplifier 58 is high. Therefore, the control circuit 62 performs a control such that the voltage Vs at both ends of the shunt resistance Rs in the second lighting mode is lower than that in the first lighting mode, thereby keeping the output voltage Vo constant. Specifically, the control circuit 62 provides control to reduce the peak value of the current supplied to the light source portion 14 such that the voltage Vs at both ends of the shunt resistance Rs in the second lighting mode is lower than that in the first lighting mode.

The PWM signal generation circuit 18 is disposed between the vehicle-side signal terminal 44 and the gate of the NMOS transistor 20. The PWM signal generation circuit 18 includes a personal computer including a central processing unit (CPU), a random access memory (RAM), a read only memory (ROM), and an input/output (I/O) interface circuit. The PWM signal generation circuit 18 generates a PWM control signal 108 whose duty ratio (on-duty ratio) changes in the range from 100% to 0% in response to the DRL/POS switching signal 106. The generated PWM control signal 108 is applied to the gate of the NMOS transistor 20 so as to control the switching operation of the NMOS transistor 20.

For example, in the first lighting mode, the PWM signal generation circuit 18 generates the PWM control signal 108 whose duty ratio (on-duty ratio) is 100% in response to the high-level DRL/POS switching signal 106. In the second lighting mode, the PWM signal generation circuit 18 generates the PWM control signal 108 whose duty ratio (on-duty ratio) is 15% in response to the low-level DRL/POS switching signal 106. The generated PWM control signals 108 are provided to the NMOS transistor 20. A drain of the NMOS transistor 20 is connected to the output terminal 30, and a source of the NMOS transistor is connected to a connection point of the shunt resistance Rs and the positive input terminal of the operational amplifier 64. The NMOS transistor 20 performs the on/off operation in response to the PWM control signal 108 from the PWM signal generation circuit 18 so as to adjust the current flowing through the light source portion 14.

Specifically, the NMOS transistor 20 is connected in series with the light source portion 14 and structured as an element of switching means for adjusting the current flowing through the light source portion 14 by turning the NMOS transistor 20 on and off. The NMOS transistor 20 switches between the first lighting mode in which the light source portion 14 stays on and the second lighting mode in which the light source portion 14 is repeatedly turned on and off in response to the DRL/POS switching signal 106.

The light source portion 14 includes multiple light-emitting diodes LED1 to LEDn, which are connected in series with each other, as a semiconductor light source. An anode of the light-emitting diode LED 1 is connected to the output terminal 28 of the LED driver 12 via the input terminal 50 and the wire harness 48. A cathode of the light-emitting diode LEDn is connected to the output terminal 30 of the LED driver 12 via the output terminal 54 and the wire harness 52.

The light source portion 14 have a single light-emitting diode LED or multiple light source blocks connected in parallel by using the light source portion as the light source block. In addition, the light-emitting diodes LED1 to LEDn can serve as the light source of various types of vehicular lamps such as a head lamp, stop and tail lamps, a fog lamp, and a turn signal lamp.

According to the foregoing structure, in the first lighting mode for lighting the DRL, the high-level signal is provided as the DRL/POS switching signal 106 from the vehicle electronic control unit (ECU) 46 to the vehicle-side signal terminal 44. Accordingly, the switch 66 is turned on, and the PWM control signal 108 whose duty ratio (on-duty ratio) is 100% is provided from the PWM signal generation circuit 18 to the gate of the NMOS transistor 20. Thus, the NMOS transistor 20 is turned on, and the current is supplied to the light-emitting diodes LED1 to LEDn of the light source portion 14 so as to light the light-emitting diodes LED1 to LEDn.

Figure 2:
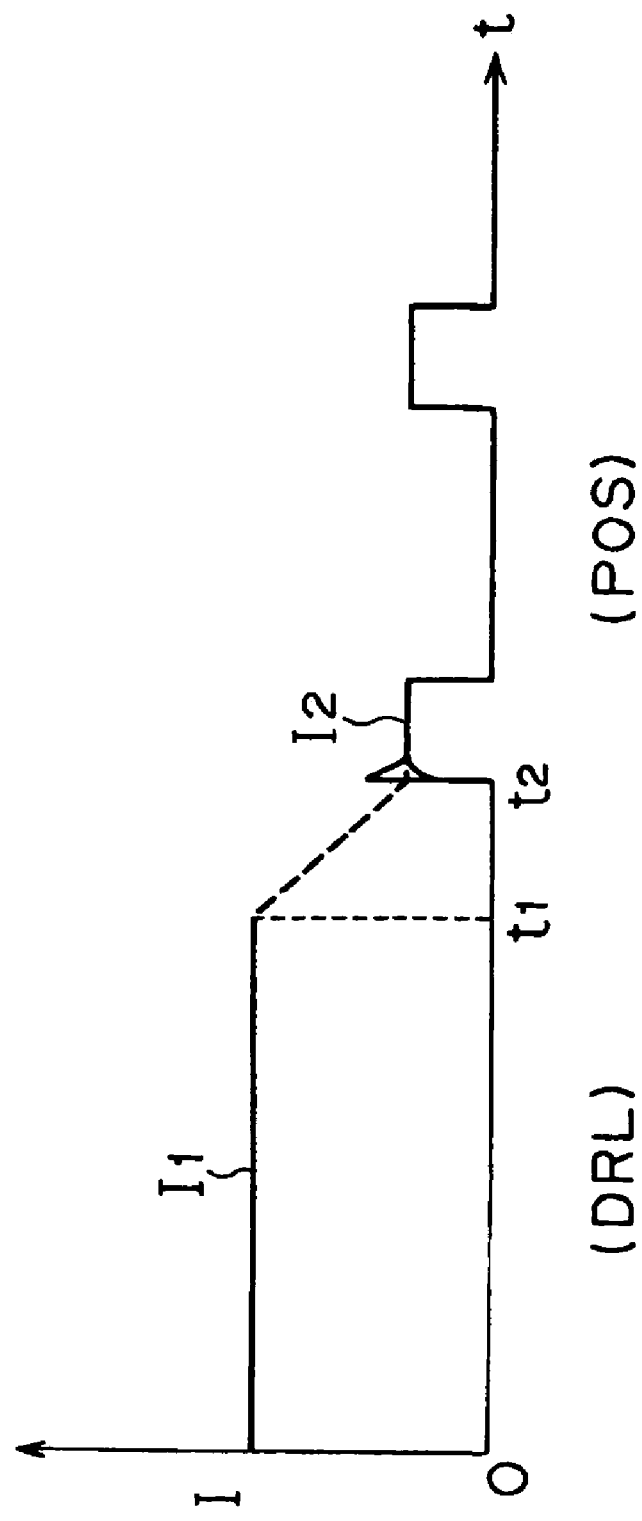
FIG. 2 is a current waveform diagram that shows a current waveform when a daytime running lamp (DRL) and position (POS) are lit.

In addition, when the switch 66 is turned on, the resistance R4 and the resistance R5 are connected in parallel between the negative input terminal and the output terminal of the operational amplifier 64. Therefore, the gain of the operational amplifier 64 is the specified value, which is smaller than that in the second lighting mode. The control circuit 62 provides control to keep the output voltage Vo of the non-inverting amplifier 58 constant. Accordingly, a specified current $I_1$ ($I_1$=Vs/Rs) is supplied from the DC/DC converter 16 to the light source portion 14 as shown in FIG. 2, and the constant current $I_1$ flows through the light-emitting diodes LED1 to LEDn and the NMOS transistor 20. In this case, the light-emitting diodes LED1 to LEDn are lit as a daytime running lamp.

Next, as shown in FIG. 2, at a timing t1, the lighting mode is switched from the first lighting mode to the second lighting mode for lighting the POS. The low-level signal is provided as the DRL/POS switching signal 106 from the vehicle electronic control unit (ECU) 46 to the vehicle-side signal terminal 44. Accordingly, the switch 66 is turned off, and the PWM control signal 108 whose duty ratio (on-duty ratio) is 15% is provided from the PWM signal generation circuit 18 to the gate of the NMOS transistor 20.

Thus, the NMOS transistor 20 repeats the on/off operation according to the PWM control signal 108, and the current is supplied to the light-emitting diodes LED1 to LEDn of the light source portion 14 so as to light the light-emitting diodes LED1 to LEDn.

In addition, when the switch 66 is turned off, only the resistance R4 is connected between the negative input terminal and the output terminal of the operational amplifier 64. Therefore, the gain of the operational amplifier 64 is higher than the specified value, which is higher than that in the first lighting mode. When the gain of the operational amplifier 64 is higher than the specified value, the output voltage Vo of the apparent non-inverting amplifier 58 is high. Therefore, in order to keep the output voltage Vo of the non-inverting amplifier 58 constant, the control circuit 62 performs a control such that the voltage Vs at both ends of the shunt resistance Rs is lower than that in the first lighting mode, in other words, the peak value of the current supplied to the light source portion 14 is reduced.

Accordingly, after a time t2, a current $I_2$, whose peak current (peak value) is smaller than that of the current $I_1$, is supplied from the DC/DC converter 16 to the light source portion 14 (the peak value of $I_2$ is one-third of that of the current $I_1$). The current $I_2$ flows through the light-emitting diodes LED1 to LEDn and the NMOS transistor 20. In other words, in the second lighting mode for lighting of the light-emitting diodes LED1 to LEDn as the position lamp, the current $I_2$ whose peak current (peak value) is smaller than that of the current $I_1$ is supplied to the light-emitting diodes LED1 to LEDn. Therefore, it is possible to suppress overshooting and undershooting in the current of the light-emitting diodes LED1 to LEDn.

In the second lighting mode, the current $I_2$, whose peak current (peak value) is smaller than that of the current $I_1$, is applied to the light-emitting diodes LED1 to LEDn and the NMOS transistor 20. In this mode, the reduced peak current (peak value) results in the application of the PWM control signal 108 whose duty ratio is higher than for the non-reduced peak current (peak value) to the NMOS transistor 20. Therefore, an appropriate current for lighting the position lamp is applied as an average current to the light-emitting diodes LED1 to LEDn.

In this case, the product of a time t and the current $I_2$ flowing through the light-emitting diodes LED1 to LEDn in the second lighting mode is set to be less than or equal to one-tenth of the product of the time t and the current $I_1$ flowing through the light-emitting diodes LED1 to LEDn in the first lighting mode. According to the present embodiment, when the first lighting mode for lighting the daytime running lamp (DRL) is switched to the second lighting mode for lighting the position lamp (POS), the apparent output voltage Vo of the non-inverting amplifier 58 is increased by raising the gain of the non-inverting amplifier 58. In addition, control is performed such that the voltage Vs at both ends of the shunt resistance Rs is smaller than that in the first lighting mode, i.e., in other words, the peak value of the current supplied from the DC/DC converter 16 to the light source portion 14 is reduced. Therefore, when the NMOS transistor 20 performs the on/off operation according to the PWM control signal 108, it is possible to suppress overshooting and undershooting in the current of the light-emitting diodes LED1 to LEDn.

In addition, according to the present embodiment, when the first lighting mode for lighting the DRL is switched to the second lighting mode for lighting the POS, the reduced peak value of the current supplied from the DC/DC converter 16 to the light source portion 14 results in the application of the PWM control signal 108 whose duty ratio is higher than that for the non-reduced peak current (peak value) to the NMOS transistor 20. Thus, the appropriate current for lighting the position lamp is supplied as the average current to the light-emitting diodes LED1 to LEDn. Therefore, it is possible to maintain the linearity of the duty ratio and the amount of light, and also suppress variation in the amount of light from the light-emitting diodes LED1 to LEDn.

Furthermore, according to the present embodiment, the product of the time t and the current $I_2$ flowing through the light-emitting diodes LED1 to LEDn in the second lighting mode is set to be less than or equal to one-tenth of the product of the time t and the current $I_1$ flowing through the light-emitting diodes LED1 to LEDn in the first lighting mode. Therefore, it is possible to light the light-emitting diodes LED1 to LEDn with high precision in a lamp used both as a daytime running lamp and as a position lamp.

Other implementations are within the scope of the claims.

What is claimed is:

1. A vehicular lamp comprising:
   a semiconductor light source;
   switching means connected to the semiconductor light source in series for adjusting a current flowing through the semiconductor light source by on/off operation; and
   current control means for detecting the current flowing through the semiconductor light source and controlling the current supplied to the semiconductor light source according to a detected current value,
   wherein the switching means is arranged to switch between a first lighting mode, in which the semiconductor light source stays on, and a second lighting mode, in which the semiconductor light source repeatedly turns on and off, and
   wherein the current control means is arranged to provide control such that a peak current flowing through the semiconductor light source in the second lighting mode is smaller than that in the first lighting mode.

2. The vehicular lamp according to claim 1 in which
   the first lighting mode is a mode for lighting a daytime running lamp; and
   the second lighting mode is a mode for lighting a position lamp, wherein the product of time and the current flowing through the semiconductor light source in the second lighting mode is less than or equal to one-tenth of the product of time and the current flowing through the semiconductor light source in the first lighting mode.

3. A vehicular lamp comprising:
   a semiconductor light source;
   circuitry connected in series to the semiconductor light source to adjusting a current flowing through the semiconductor light source by on/off operation; and
   circuitry to detect the current flowing through the semiconductor light source and to control the current supplied to the semiconductor light source according to a detected current value,
   wherein the lamp is arranged to switch between a first lighting mode, in which the semiconductor light source stays on, and a second lighting mode, in which the semiconductor light source repeatedly turns on and off, and
   wherein the lamp is arranged such that a peak current flowing through the semiconductor light source in the second lighting mode is smaller than that in the first lighting mode.

* * * * *